(12) United States Patent
Nozaki et al.

(10) Patent No.: US 7,464,809 B2
(45) Date of Patent: Dec. 16, 2008

(54) FLAT BELT

(75) Inventors: Tatsuya Nozaki, Nara (JP); Seiichi Kitamura, Nara (JP); Yoshiro Tamaki, Nara (JP)

(73) Assignee: Nitta Corporation, Osaka (JP)

( * ) Notice: Subject to any disclaimer, the term of this patent is extended or adjusted under 35 U.S.C. 154(b) by 0 days.

(21) Appl. No.: 11/114,172

(22) Filed: Apr. 26, 2005

(65) Prior Publication Data

US 2006/0237289 A1  Oct. 26, 2006

(51) Int. Cl.
*B65G 15/34* (2006.01)
*B65G 45/02* (2006.01)

(52) U.S. Cl. .......................... 198/847; 198/846; 198/500

(58) Field of Classification Search ................. 198/847, 198/846
See application file for complete search history.

(56) References Cited

U.S. PATENT DOCUMENTS

| | | | | |
|---|---|---|---|---|
| 2,310,819 | A | * | 2/1943 | Van Orden ................... 198/847 |
| 3,415,700 | A | * | 12/1968 | Webster ....................... 156/164 |
| 3,593,840 | A | * | 7/1971 | Guyer ......................... 198/847 |
| 3,900,627 | A | * | 8/1975 | Angioletti et al. ............ 428/114 |
| 5,164,241 | A | | 11/1992 | Andre De La Porte et al. |
| 5,658,670 | A | * | 8/1997 | Fukushi et al. ............... 428/421 |
| 5,705,446 | A | | 1/1998 | Fujishiro et al. |
| 5,938,007 | A | * | 8/1999 | Fujihiro et al. ............... 198/847 |

FOREIGN PATENT DOCUMENTS

| | | |
|---|---|---|
| EP | 0630739 | 12/1994 |
| JP | 61-165045 | 7/1986 |
| JP | 6-171787 A | 6/1994 |
| JP | 8-099704 A | 4/1996 |
| JP | 9-169416 | 6/1997 |
| JP | 2584618 Y2 | 8/1998 |
| JP | 2000-136009 | 5/2000 |
| JP | 2001-153186 A | 6/2001 |
| JP | 2001-159027 A | 6/2001 |
| JP | 2001-153186 | 8/2001 |
| JP | 2003-246482 A | 9/2003 |
| WO | 00/35785 | 6/2000 |

OTHER PUBLICATIONS

English language abstract of JP 2000-136009.
English language Abstract of JP 2001-153186.
English language Abstract of JP 9-169416.
A partial translation of Japanese Laid-open Patent Publication No. 2000-136009 A.
English language Abstract of JP 61165045.
English language Abstract and translation of JP 2001-153186 A.

(Continued)

*Primary Examiner*—Gene O. Crawford
*Assistant Examiner*—Kavel P Singh
(74) *Attorney, Agent, or Firm*—Greenblum & Bernstein, P.L.C.

(57) ABSTRACT

A flat belt is used for conveying an object on a surface of the flat belt. The flat belt has a tension member and fabric. The tension member is resistant to load in a longitudinal direction of the flat belt. The fabric is disposed on at least one of an inner side and an outer side of the tension member. And, the fabric is stretchable in the longitudinal direction.

15 Claims, 5 Drawing Sheets

OTHER PUBLICATIONS

English language Abstract and translation of JP 8-099704 A.
English language translation of JP 2584618 Y2.
English language Abstract and translation of JP 6-171787 A.
English language Abstract and translation of JP 2001-159027 A.
English language Abstact and translation of JP 2003-246482 A.

* cited by examiner

FLAT BELT

BACKGROUND OF THE INVENTION

1. Field of the Invention

The present invention relates to a flat belt which is used for conveying an object on a surface of the flat belt, in particular which is used for conveying paper.

2. Description of the Related Art

The flat belt is used for conveying an object, for example paper, on an outer surface thereof. Conventionally, the flat belt has a belt body including a tension member and a fabric which covers the belt body. The tension member, which is disposed along the pitch line of the flat belt, usually has the great stiffness in order to resist load.

However, the flat belt is not sufficiently stretchable and flexible in the longitudinal direction thereof due to the stiff tension member. Therefore, it is not appropriate that the flat belt is installed on a small pulley (for example when the diameter is less than 25 mm). Namely, when the flat belt is wound and revolved around the small pulley, the belt is broken immediately, for example the fabric is separated from the belt body or the yarn of the fabric in longitudinal direction of the flat belt is cut.

Further, when the object conveyed by the flat belt is printed paper, the ink on the printed paper is sometimes wet, therefore the ink sometimes transfers to the outer surface of the flat belt. If the outer surface consists of a fabric, the fabric is impregnated with the ink when the ink transfers outer surface. In this case, the fabric can hold the impregnated ink to some extent, therefore if the amount of the impregnated ink is little, the impregnated ink is not released from the fabric.

However, if the amount of ink that impregnates the fabric is over a predetermined amount, the fabric can not hold the impregnated ink. In this situation, the impregnated ink in the fabric is transferred to the conveyed paper which contacts the outer surface of the fabric, so that the conveyed paper becomes dirty. Further, it is impossible to remove the impregnated ink from the fabric even if the outer surface is wiped using alcohol etc. Namely, the flat belt can not be used for conveying paper, if the amount of the ink impregnated into the fabric increases more than the predetermined amount.

Furthermore, it is known that a flat belt which has a resin layer as an outer surface, is used for conveying paper thereon. For example, the flat belt has the outer surface consisting of a fluoropolymer resin film, as shown in Japanese Unexamined Patent Publication (KOKAI) NO.2000-136009. In this belt, the wet ink is not easily transferred to the outer surface due to the water and oil repellent proprieties of the fluoropolymer resin. Further, even if the ink transfers to the outer surface, it is easy to remove the ink from the surface by wiping using alcohol because the transferred ink is not impregnated into the fluoropolymer resin. Namely, the fluoropolymer resin film prevents the transferred ink from retransferring to the conveyed paper.

However, the fluoropolymer resin film is very hard therefore this flat belt tends to scratch the paper. Further, a flat belt having a hard film surface is not sufficiently flexible and therefore such a flat belt should not be installed on a small pulley. Additionally, it is easy for the fluoropolymer resin film to separate from the belt body because the adhesion the between the fluoropolymer resin and the belt body is not good.

SUMMARY OF THE INVENTION

Therefore, a primary object of the present invention is to provide a flat belt, which has the high flexibility and which is suitable for installing on a small pulley. A secondary object of the present invention is to provide a flat belt, which is suitable for conveying printed paper.

According to the present invention, there is provided a flat belt for conveying an object on a surface of the flat belt. And the flat belt comprises a tension member that is resistant to load in a longitudinal direction of the flat belt, and a fabric that is disposed on at least one of an inner side and an outer side of the tension member. The fabric is stretchable in the longitudinal direction.

When the fabric is disposed on at least one surface of the flat belt, preferably the fabric comprises a yarn, which is covered with a mixture including a binder and fluoropolymer resin.

The fabric is preferably subjected to a treatment involving penetration of a solution including the mixture into the fabric, and dry treating so as to cover the yarn with the mixture. The binder comprises at least one of a urethane resin, rubber latex, and acrylic resin for example.

The fabrics can be disposed on both the outer and inner surfaces of the flat belt. In this case, the fabrics comprise a yarn, which is covered with a mixture including a binder and fluoropolymer resin.

If the fabric includes a first yarn disposed in the longitudinal direction, the first yarn is preferably stretchable in the longitudinal direction. Further, the first yarn can be a multifilament. The multifilament may be at least one of a bulky yarn, a yarn which is formed by bundling a plurality of filaments, and a covering yarn. The covering yarn comprises a core elastomeric strand and a cover strand covering the core elastomeric strand.

If the fabric includes a second yarn disposed in a width direction of the flat belt, the second yarn is at least one of monofilament and spun yarn.

Further, the first yarn may include at least one of a crimped fiber strand, a polytrimethylene terephthalate fiber strand, and a elastomeric strand.

The fabric is a woven fabric or a knitted fabric, for example. Further, the tension member is a fabric tension member for example. Preferably the tensional stiffness of the tension member is greater than that of the fabric in the longitudinal direction.

According to the present invention, there is provided a flat belt for conveying an object on a surface of the flat belt. The belt comprises a fabric disposed on at least one surface of the flat belt. And the fabric comprises a yarn, which is covered with a mixture including a binder and fluoropolymer resin.

BRIEF DESCRIPTION OF THE DRAWINGS

The present invention will be described below with reference to the embodiment shown in the drawings.

DESCRIPTION OF THE PREFERRED EMBODIMENTS

Figure 1:
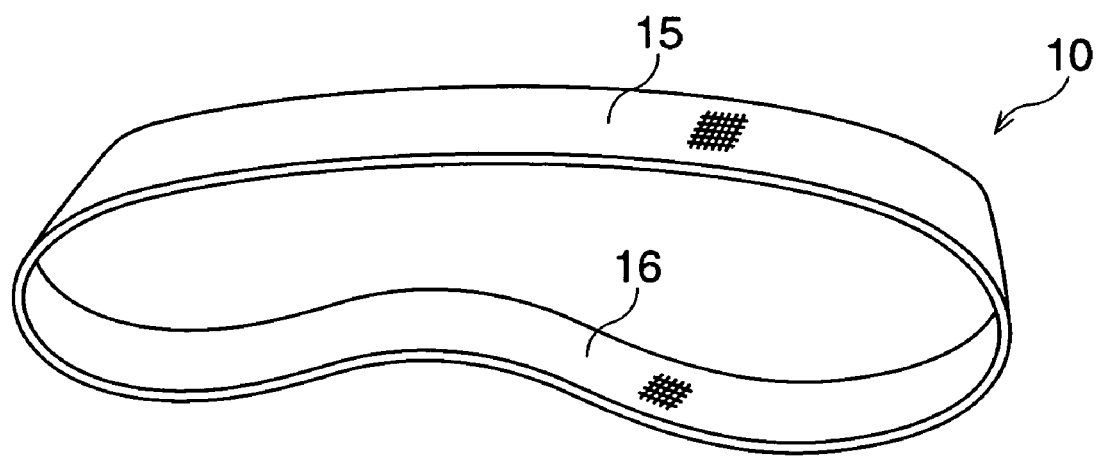
FIG. 1 is a perspective view of a flat belt of a first embodiment.

The present invention will be described below with reference to the embodiments shown in the drawings.

Figure 2:
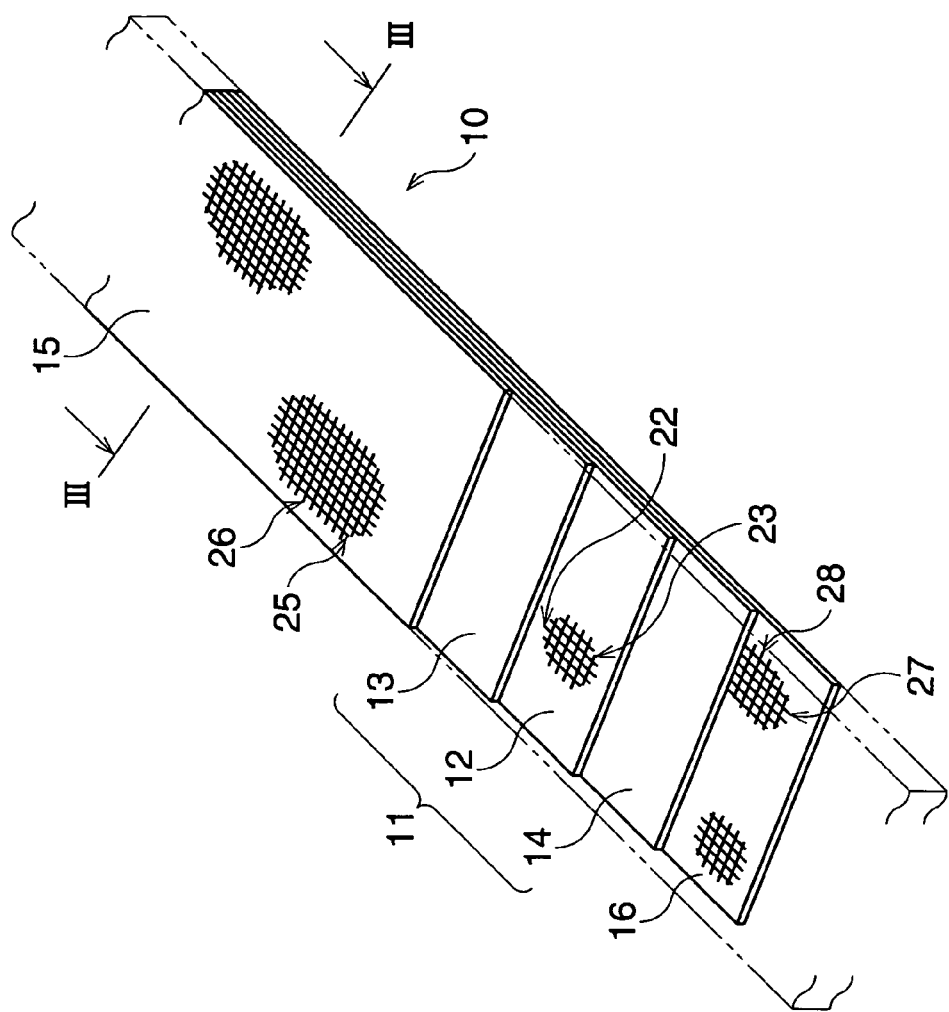
FIG. 2 is a partially cutaway perspective view of a flat belt of a first embodiment.
Figure 3:
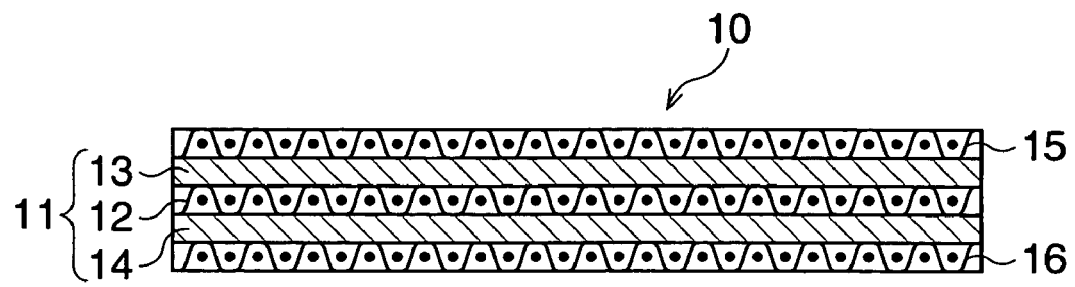
FIG. 3 is a cross-sectional view along line III-III of the FIG. 2.

FIGS. 1-3 show a flat belt of a first embodiment. The flat belt 10 is an endless belt as shown in FIG. 1. The flat belt 10 has a belt body 11. The belt body 11 comprises a fabric tension member 12 which is arranged along a pitch line of the flat belt 10, a first elastomer layer 13 which is disposed on the fabric tension member 12 at the outer surface of the flat belt 10, and a second elastomer layer 14 which is disposed on the fabric tension member 12 at the inner surface. The flat belt 10 further has an outer fabric 15 which is covered on the first elastomer layer 13 at the outer side, and the inner fabric 16 which is covered on the second elastomer layer 14 at the inner side. Due to this, the outer fabric 15 is formed on the outer surface of the flat belt 10 and the inner fabric 16 is formed on the inner surface of the flat belt 10.

The fabric tension member 12, the first and second elastomer layers 13 and 14, and the outer and inner fabrics 15 and 16 are laminated and bonded one another to form one body.

The fabric tension member 12 is a woven fabric which is woven with first yarns 22 extending in a longitudinal direction of the flat belt 10 and second yarns 23 extending in a width direction of the flat belt 10. The first and second yarns 22 and 23 are very stiff yarns so that the fabric tension member 12 is resistant to load in the longitudinal and width directions. Due to this, the tensional stiffness of the fabric tension member at least in a longitudinal direction of the flat belt 10 is greater than that of the inner and outer fabrics 15 and 16 in the longitudinal direction. The first and second yarns 22 and 23 are preferably multifilament yarns, and include polyester fiber such as a polyethylene terephthalate (PET) fiber, nylon fiber, aramid fiber, other fibers or, a mixture thereof.

Further, the comparison of the tensional stiffness is done by comparing the tensile load at a same elongation (for example at 10% elongation with respect to an original length) when test samples (for example fabric) having the same width and length are pulled in a longitudinal direction of the test sample at the same speed by a tension tester.

The first and second elastomer layers 13 and 14 include a thermoplastic elastomer as a polymer component and various additives as the need arises. As the thermoplastic elastomer, a polyurethane elastomer (polyurethane resin elastomer), polyester elastomer, polyamide elastomer, polyolefinic elastomer, polyvinyl chloride, other elastomer or a mixture thereof is used for example. The thickness of the first and second elastomer layers 13 and 14 are preferably from 0.15 mm to 0.30 mm. Further, the hardness (shore A) of the first and second elastomer layers are preferably from 70 to 90 degrees.

The outer fabric 15 is a woven fabric which is woven with first yarns 25 extending in the longitudinal direction of the flat belt 10 and second yarns 26 extending in the width direction of the flat belt 10. Similarly, the inner fabric 16 is a woven fabric which is woven with first yarns 27 extending in the longitudinal direction and second yarns 28 extending in the width direction.

The first yarns 25 and 27 of the inner and outer fabrics 15 and 16 have stretchability and the second yarns 26 and 28 are not stretchable. Therefore, the outer and inner fabrics 15 and 16 have stretchability in the longitudinal direction and are stiff in the width direction. The first yarns 25 and 27 are multifilament yarns, for example bulky yarns such as woollie yarns, or covering yarns etc. The covering yarn includes a core strand and a cover strand covering over the core strand. In this case, the core strand is an elastomeric strand such as a urethane elastomeric strand. The bulky yarn is a crimped yarn obtainable by crimping a multifilament which is formed by bundling a plurality of filaments including nylon fiber, other fibers, or a mixture thereof. Namely, the bulky yarn is for example a woollie nylon yarn. Further, a polytrimethylene terephthalate filament can be used in the multifilament yarns. In this case, the multifilament yarn is formed by bundling a plurality of polytrimethylene terephthalate filaments for example. The second yarns 26 and 28 are a spun yarn such as a polyester spun yarn, or a monofilament such as a polyester monofilament.

The outer and inner fabrics 15 and 16 are formed by selecting the above structures properly. The outer and inner fabrics 15 and 16 can be composed of the same materials or can be composed of different materials. In this specification, "the first yarn" means the yarn extending in the longitudinal direction of the flat belt 10 and can be a warp or a weft. "The second yarn" means the yarn extending in the width direction of the flat belt 10 and can be weft or warp.

For example, when the flat belt 10 is used for conveying an object, the flat belt 10 is wound around one or more than one pulley, an object is put on the outer surface of the flat belt 10, and then the flat belt 10 is rotated so as to convey the object.

As described above, the stretchable fabrics 15 and 16 are covered on the belt body 11 so the flat belt 10 is flexible in the longitudinal direction. Therefore, when the flat belt 10 is rotated around the small pulley, the flat belt is not broken in a short time. For example, the fabric 15 or 16 is not separated from the belt body 11 and the filaments of the fabric 15 and 16 are not cut. Further, the fabric tension member 12 is arranged along the pitch line so that the flat belt 10 can resist the strong load. Due to this construction, the flat belt 10 of this embodiment has a long life span even if the flat belt 10 is installed on a small pulley.

Figure 4:
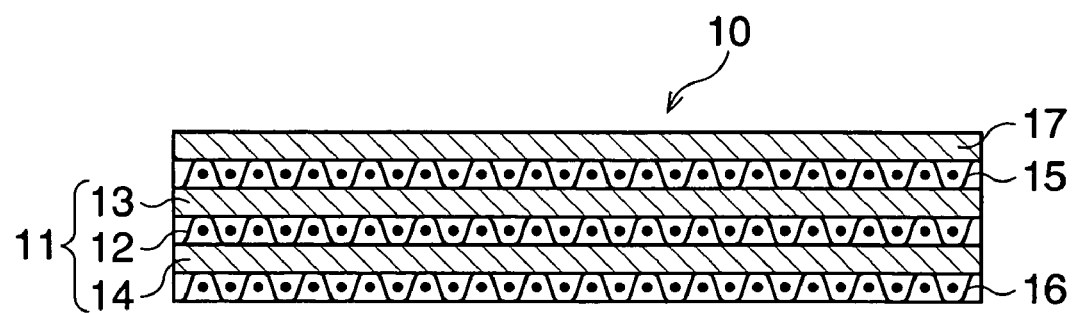
FIG. 4 is a cross-sectional view of the second embodiment.
Figure 5:
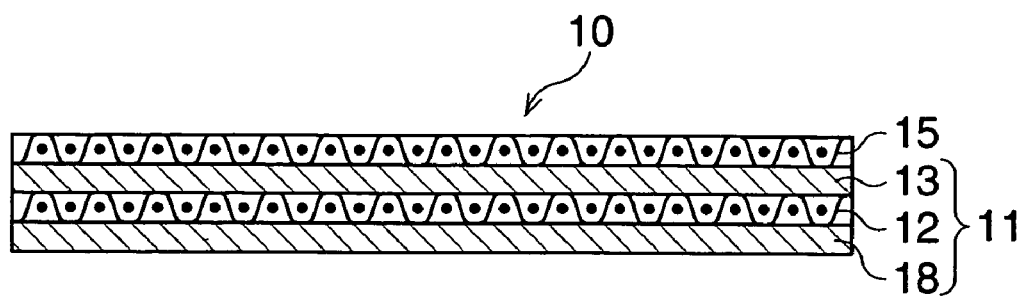
FIG. 5 is a cross-sectional view of the third embodiment.

FIGS. 4 and 5 show the flat belt of second and third embodiments. The inner and outer surfaces of the flat belt 10 in the first embodiment are formed of the fabrics 15 and 16. However, the inner and/or outer surfaces of the flat belt 10 may not be formed of the fabric, as shown in the second and third embodiments. In this case, the inner and outer surfaces may be formed of an elastomer layer for example.

In the second embodiment, the flat belt 10 has the belt body 11, the outer fabric 15, and the inner fabric 16 in the same way as the first embodiment. However, in this embodiment, the third elastomer layer 17 is disposed on the outer fabric 15.

Due to this, the outer surface of the flat belt 10 is formed of a third elastomer layer 17. Namely, in this embodiment, the conveyed object is put on the third elastomer layer 17 in order to convey the object.

The third elastomer layer 17 comprises a polymer component with various additives as the need arises. As the polymer component, a rubber or a thermoplastic elastomer is used for example. The rubber is a natural rubber, isoprene rubber, butadiene rubber, styrene butadiene rubber, ethylene propylene rubber, chloroprene rubber, chlorinated polyethylene, epichlorohydrin rubber, nitrile rubber, acrylic elastomer, urethane rubber, other rubber, or mixture thereof for example. The thermoplastic elastomer is a polyurethane elastomer (polyurethane resin elastomer), polyester elastomer, polyamide elastomer, polyolefinic elastomer, polyvinyl chloride, other elastomers, or a mixture thereof for example. Further, the belt body 11, the outer fabric 15, and the inner fabric 16 have the same structure as in the first embodiment, therefore, the explanation of these is omitted. Further, the hardness (shore A) of the third elastomer layer is preferably from 30 to 95 degrees.

The elastomer layer makes a powerful friction force act on the conveyed object. Therefore, the elastomer layer grips the conveyed object better than the outer fabric surface of the first embodiment.

Further, the third elastomer layer 17 may be arranged at the inner surface of the flat belt 10, and the inner fabric 16 may be arranged at the outer surface of the flat belt 10. In this case, the flat belt 10 is wound around one or more than one pulley so that the third elastomer layer 17 contacts the pulley. Therefore, a powerful friction force is generated between the pulley and the elastomer layer 17 because the elastomer layer grips the contacted pulley better than the inner fabric surface.

FIG. 5 shows the flat belt of a third embodiment. The flat belt 10 of the first embodiment has the inner fabric 16. However, in the third embodiment, the flat belt 10 is not provided with the third fabric 16.

In the third embodiment, the belt body 11 is composed of the fabric tension member 12, the first elastomer layer 13 which is disposed on the fabric tension member 12 at the outer side, and a forth elastomer layer 18 which is disposed on the fabric tension member 12 at the inner side. The outer fabric 15 is covered on the first elastomer layer 13. On the other hand, the inner fabric 16 is not covered on the forth elastomer layer 18. Due to this, the forth elastomer layer 18 forms the inner surface of the flat belt 10. Further, the fabric tension member 12, the first elastomer layer 13, and the outer fabric 15 have the same structure of those in the first embodiment. The forth elastomer layer 18 has same structure of the third elastomer layer 17 in the second embodiment. Therefore the explanation of these is omitted.

Of course, the forth elastomer layer 18 may be arranged at the outer surface of the flat belt 10, and the outer fabric 16 may be arranged at the inner surface of the flat belt 10.

In the third embodiment, the elastomer layer grips the conveyed object or the pulley better than the inner and outer fabrics 15 and 16 of the first embodiment.

Of course, both the inner and outer surfaces of the flat belt 10 may be formed of the elastomer layer in the second and third embodiments.

Figure 6:
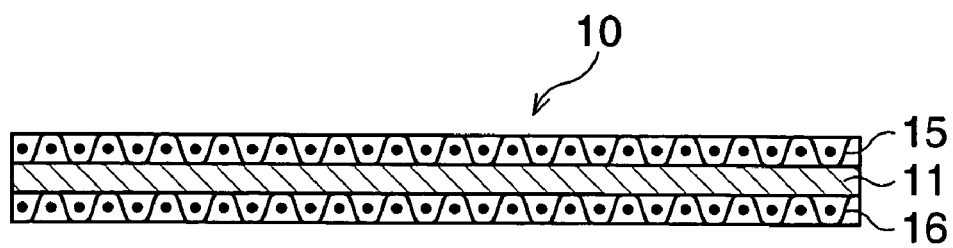
FIG. 6 is a cross-sectional view of the forth embodiment.

FIG. 6 shows the flat belt of a forth embodiment. In the first embodiment, the belt body 11 is provided with the fabric tension member 12 on the center thereof, but the belt body 11 does not have the fabric tension member 12 in the forth embodiment. The belt body 11 in this embodiment is composed of a resin sheet which becomes a tension member, in order to resist load in a longitudinal and width directions of the flat belt 10. As the resin sheet, thermoplastic urethane resin, polyamide elastomer, polyester elastomer, nylon resin (for example a stretched nylon sheet), other resins or a mixture thereof can be used.

Further, the belt body 11 of this embodiment may be composed of the elastomer layer which having the same component of the first and second elastomer layers of the first embodiment. However, the tensional stiffness of the elastomer layer 10 in the longitudinal direction should be greater than that of the inner and outer fabrics 15 and 16 in the longitudinal direction in order to resist load in the longitudinal direction.

Next, a fifth embodiment will be explained below using FIGS. 1-3. The flat belt 10 of the first embodiment has the same structure as that of the first embodiment except that the outer fabric 15 contains a mixture including a binder and a fluoropolymer resin. The differences from the first embodiment will be described next.

In the fifth embodiment, the surface of the first and second yarns 25 and 26 of the outer fabric 15 are covered with a mixture including a binder and fluoropolymer resin. The fluoropolymer resin which is used in this embodiment is the water and oil repellent. The kind of fluoropolymer resin is not limited, but the fluoropolymer resin can be a polymer having perfluoroalkyl group(s) for example. The binder can be a urethane resin, rubber latex, acrylic resin, or a mixture thereof for example, but the urethane resin or rubber latex is preferable. This is why the hardness of a urethane resin and rubber latex is low and therefore, these materials do not decrease the flexibility of the flat belt 10 so much.

The urethane resin is a polyester urethane resin for example. The rubber latex is an acrylonitrile butadiene copolymer latex, carboxylated acrylonitrile butadiene copolymer latex, other latex, or a mixture thereof. The acrylic resin is obtainable by copolymerization of acrylate, methacrylate, or a mixture thereof with acrylic acid, methacrylic acid, styrene, acrylonitrile, other monomers, or mixture thereof. Of course, the binder is not limited to these.

The outer fabric 15 is subjected to a treatment involving penetration of a fluoropolymer resin solution (hereafter "FR solution") into the outer fabric 15, and heat-dry treating so as to cover the first and second yarns 25 and 26 with the mixture including binder and fluoropolymer resin. The FR solution is dispersion or solution of the binder, the fluoropolymer resin, and other additives into a solvent (for example, water or organic solvent etc). In view of the environment and for ease of handling, preferably the binder and the fluoropolymer resin are capable of dispersing or dissolving in water, for example the urethane resin is preferably a water based urethane resin.

The treatment involving penetration is done by coating or spraying one surface of the outer fabric 15 (the outside surface of the flat belt 10) with the FR solution. It is preferable that the outer surface of the flat belt 10 is coated or sprayed with the FR solution in order to cover the yarns 25 and 26 with the mixture, after the outer fabric 15 adheres to the belt body 11 to form the flat belt. Of course, one surface of the single outer fabric 15 may be coated or sprayed before the outer fabric 15 adheres to the belt body 11. However, if the outer fabric includes the fluoropolymer resin, the power of adhesion of the outer fabric 15 to the belt body 11 becomes low. Therefore, the outer fabric 15 is preferable coated or sprayed after the outer fabric 15 adheres to the belt body 11.

In this embodiment, the FR solution is penetrated into the outer fabric 15 and then the outer fabric 15 is heat dried so that the surface of the yarns 25 and 26 are covered with the mixture of the binder and fluoropolymer resin. In this case, the FR solution is also penetrated into the yarns 25 and 26. Therefore, the mixture covers not only the surface of the yarns 25 and 26, but also the surfaces of the filament strands, or etc. which are included in the yarns 25 and 26.

As described above the outer surface of the flat belt 10 has the outer fabric 15, of which the yarns are covered with the mixture including the binder and the fluoropolymer resin. Therefore, if the wet ink on the printed paper which is conveyed by the flat belt 10 contacts the outer fabric 15, the wet ink is rarely transfers the outer fabric 15 because of the water and oil repellent properties of the fluoropolymer resin. Further, if the wet ink transfers the outer fabric 15, the wet ink does not impregnate the outer fabric 15 because of the water and oil repellent properties of the fluoropolymer resin. The wet ink which transfers to the outer fabric 15 is removed easily by alcohol wipe because the wet ink does not impregnate the outer fabric 15. Accordingly, the outer surface 15 of this embodiment effectively prevents the ink from retransferring to the printed paper which is conveyed by the flat belt 10.

Further, the mixture which covers the yarns 25 and 26 includes not only the fluoropolymer resin but also the binder, so that the mixture strongly adheres to the surface of the yarns 25 and 26 due to the binder. Therefore, the fluoropolymer resin is not removed from the surface of the yarn even if the outer fabric 15 is wiped using alcohol etc. due to the bonding properties of the binder. Accordingly, the water and oil repellent of the outer fabric 15 continues for a long period.

In this embodiment, the mixture including the binder and fluoropolymer resin is not laminated on the outer fabric 15, but adheres to the surface of the yarns of the outer fabric. Due to this, the flat belt 10 maintains the flexibility and stretchability of the original fabric of the outer fabric 15. Therefore, it is possible for the flat belt 10 to be installed on a small pulley, and the conveyed objected (for example paper) is not scratched by the outer surface of the flat belt 10.

Furthermore, because the first yarns 25 of the outer surface 15 are multifilament yarns, the surface area is larger than when using the monofilament. Hence a large quantity of the mixture including the binder and the fluoropolymer resin adheres to the surface of the yarn, and this results in the superior water and oil repellent properties.

In this embodiment, the fabric containing the mixture including the binder and the fluoropolymer resin is arranged at the surface where the objects are conveyed. However, the surface where the fabric containing the mixture including the binder and the fluoropolymer resin is arranged is not limited to the surface on which the object to be conveyed is put.

Accordingly, in this embodiment, the yarns 27 and 28 of the inner fabric 16 are not covered with the mixture including the binder and fluoropolymer resin. However, the yarns 27 and 28 can also be covered with the mixture including the binder and fluoropolymer resin in the same way as the outer surface 15 of this embodiment. Further, the composition of the FR solution penetrating into the inner fabric 16 may be the same as that of the FR solution penetrating into the outer fabric 15 or may be difficult from that. Of course, even if the yarns 25 and 26 of the outer fabric 15 are not covered with the mixture including the binder and fluoropolymer resin, the yarns 27 and 28 of the inner fabric 16 can be covered with the mixture including the binder and fluoropolymer resin.

Furthermore, at least one of the outer fabric 15 and the inner fabric 16 may contain the mixture including the binder and fluoropolymer resin in the second, third, and forth embodiments. Namely, the mixture including the binder and fluoropolymer resin may cover the yarns of at least one of the outer fabric 15 and the inner fabric 16 in the second, third, and forth embodiments. However, in this case, the outer fabric 15 and the inner fabric 16 containing the mixture is preferably disposed on the outer or inner surface of the flat belt 10 for the belt surface having water and oil repellent.

Additionally, in the first, second, third, forth, and fifth embodiments, the outer fabric 15 and the inner fabric 16 are woven fabric. However, at least one of the outer fabric 15 and the inner fabric 16 may be a knitted fabric which is knitted from the yarns.

EXAMPLES

The present invention will be explained with reference to examples of the invention as well as Comparative Examples. Note that the present invention is not limited in any way by these examples.

Example 1

The flat belt of Example 1 was constructed according to the first embodiment. In Example 1, the fabric tension member was the woven fabric having a thickness of 0.4 mm. The first yarns of the woven fabric extending in the longitudinal direction and the second yarns extending in the width direction were respectively multifilament yarns and spun yarns, comprising polyethylene terephthalate (PET) fiber. The first and second elastomer layers were thermoplastic polyurethane elastomer layers having a thickness of 0.2 mm and having a hardness (shore A) of 85 degree. The inner and outer fabrics were woven fabrics having a thickness of 0.35 mm. The woven fabric was woven with woollie nylon yarns (first yarns) extending in the longitudinal direction, and PET monofilaments (the second yarns) extending in the width direction of the flat belt. Namely, in Example 1, the tensional stiffness of the fabric tension member was greater than that of the inner and outer fabrics in the longitudinal direction of the flat belt.

The first elastomer layer and outer fabric were laminated in sequence on one surface of the fabric tension member, and the second elastomer layer and the inner fabric were laminated on another surface of the fabric tension member, so that the flat belt of Example 1 was obtained. In the lamination, the yarns of the fabrics were pushed into the elastomer layers therefore the thickness of the flat belt was 1.0 mm which was less than the total thickness of the layers and fabrics.

Comparative Example 1

The flat belt of Comparative Example 1 had the same structure as that of the flat belt of Example 1 except that the yarns of the inner and the outer fabrics. In the Comparative Example 1, the first yarns extending in the longitudinal direction were composed of nylon multifilament without stretchable property, and the second yarns extending in the width direction were composed of a nylon monofilament in the inner and outer fabrics.

[Performance Test 1]

Figure 7:
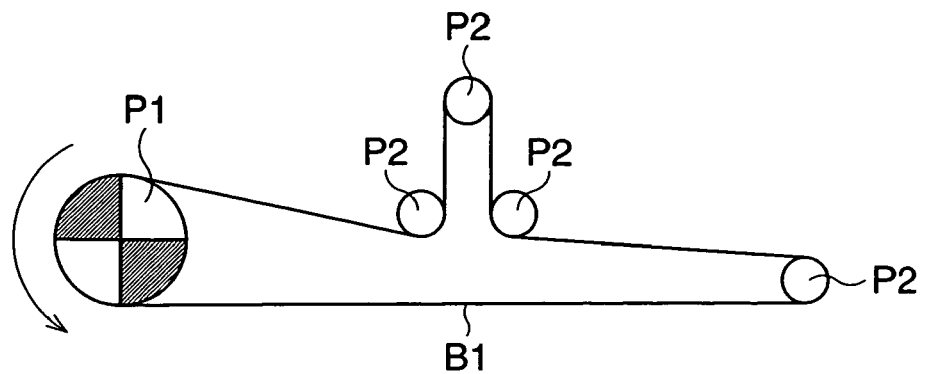
FIG. 7 is an outline view of the first test apparatus.

The flat belt B1 of Example 1 or Comparative Example 1 was installed on the first test apparatus having five pulleys P1 and P2 as shown in the layout of FIG. 7. The pulley P1 was a driving pulley and the flat belt B1 was revolved by rotating the driving pulley P1.

In this test, the flat belts of Example 1 and Comparative Example 1 had a width of 20 mm and length of 1000 mm. The pulleys P1 had a diameter of 40 mm and the pulley P2 had a diameter of 25 mm. When the flat belts were installed in the pulleys, the installation elongation rate of the flat belts was 1-2% with respect to an original length of the flat belt. The test temperature was a normal temperature (about 20-30 centigrade degrees). The flat belt was revolved at 12.6 m/s.

The result for Comparative Example 1 was that the outer fabric separated from the elastomer layer so that the flat belt broke, when the number of bending times was $1.5 \times 10^7$. On the other hand, the flat belt of Example 1 was not broken, even when the number of bending times reached $3.0 \times 10^8$. Further, the number of bending times equals the number of times a predetermined portion of the flat belt B1 is passed over the pulley P2 and hence bent. Therefore, the number of bending times increases 4 if the flat belt B1 is revolved one cycle in the first test apparatus.

Figure 8:
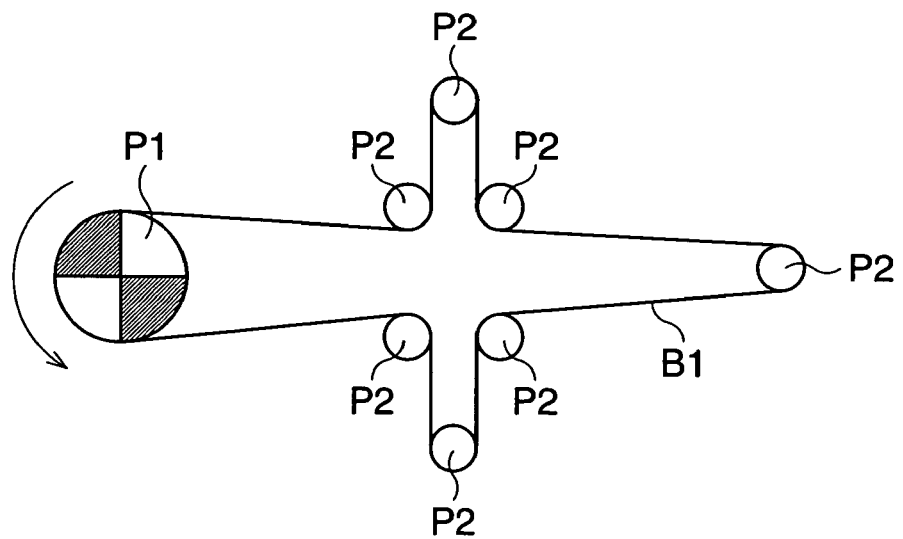
FIG. 8 is an outline view of the second test apparatus.

Furthermore, when the flat belt B1 of Example 1 was installed on the second test apparatus having pulleys P1 and P2 as shown in the layout of FIG. 8 and the flat belt B1 was revolved by rotating the driving pulley P1, the flat belt of Example 1 was not broken, even when the number of bending times reached $3.0 \times 10^8$. In this test, the pulley P1 was a driving pulley having a diameter of 40 mm, and the pulleys P2 had a diameter of 15 mm.

As shown by above tests, the flat belt of Example 1 could be driven for a longer time than the flat belt of Comparative Example 1 when the flat belt was installed on small pulleys such as the pulleys having a diameter of 15 or 25 mm. Namely, the flat belt of Example 1 did not break, for example the fabric did not separate from the belt body for a long time even when the flat belt was installed on a small pulley. Additionally, because the woollie nylon yarns having good stretchability were used as the first yarns, the first yarns of the inner and outer fabrics were not cut if the flat belt was installed on small pulleys, so that the flat belt did not break for a long time.

Example 2-4

The flat belts of Examples 2-4 were constructed according to fifth embodiment The flat belts of Examples 2-4 had the inner fabric, the second elastomer layer, the fabric tension member, the first elastomer layer, and the outer fabric disposed in sequence from the inner side of the flat belt, the same as Example 1. The fabric tension member was the woven fabric with the polyester multifilament yarns (the first yarns) extending in the longitudinal direction and the polyester spun yarns (the second yarns) extending in the width direction. The first and second elastomer layers were thermoplastic ester polyurethane elastomer layers. The inner and outer fabrics were woven fabrics with woollie nylon yarns (the first yarns) extending in the longitudinal direction, and polyester monofilament yarns (the second yarns) extending in the width direction. The outer surface of the outer fabric was knife coated with the RF solution and then was heat dried after the outer fabric was laminated on the first elastomer layer, so that the mixture including the binder and fluoropolymer resin adhered to the surface of the yarns of the outer fabric.

Further in Example 2, a polyester urethane resin (water based type) was used as the binder. In Example 3, a copolymer of an acrylonitrile, an alkyl acrylate, a styrene, and a methacrylic acid was used as the acrylic resin binder. In Example 4, carboxylated acrylonitrile butadiene copolymer latex was used as the rubber latex binder. In Examples 2-4, a perfluoroalkyl acrylate was used as the fluoropolymer resin. Further, an acrylate copolymer resin as a thickening agent, a hydrocarbon oil as an anti-foaming agent, and an anionic active agent were added to the RF solution of Examples 2-4 and water was used as the solvent in Examples 2-4.

Comparative Example 2

In the flat belt of Comparative Example 2, a comparative solution was coated on the outer surface of the outer fabric instead of the RF solution. The comparative solution had the same formulation as Example 2 except that the fluoropolymer resin was not added.

[Performance Test 2]

In Examples 2-4 and Comparative Example 2, when a drop of ink was dropped on the outer surface of each of the flat belts and after the dropped ink was wiped off using ethanol, the appearances of the outer surface were visually observed, so that the flat belts were evaluated.

In Example 2-4, when the drop of ink was dropped, the ink was repelled by the outer fabric and the ink remained on the outer surface. On the other hand in Comparative Example 2, when the drop of ink was dropped, a part of the ink impregnated into the outer fabric.

In Example 2-4, the ink which had been dropped on the outer surface could be removed almost perfectly from the outer surface by wiping using ethanol. On the other hand in Comparative Example 2, a part of the ink remained in the outer fabric after the outer surface was wiped using ethanol. Furthermore in Example 2-4, when the drop of ink was dropped repeatedly and the outer surface was wiped repeatedly, the ink did not impregnate into the fabric much.

As described above, it can be understood that the outer fabric had the water and oil repellent effect because the yarns of the outer fabric were covered with the fluoropolymer resin in Examples 2-4. Furthermore, in Examples 2-4, after the surface of the belt was wiped repeatedly, the fluoropolymer resin continued to adhere to the yarns of the outer fabric so that the water and oil repellent effect of the outer fabric remained because the RF solution of Examples 2-4 included the binder.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Applications No. 2003-370428 (filed on Oct. 30, 2003) and No. 2005-087953 (filed on Mar. 25, 2005) which are expressly incorporated herein, by references, in their entirety.

The invention claimed is:

1. A flat belt for conveying an object on a surface of said flat belt, comprising:
   a belt body having outer and inner surfaces, said belt body including a tension member, wherein said tension member has a tension member material extending in a longitudinal and a width direction of the flat belt such that said tension member is resistant to load in a longitudinal direction of said flat belt; and
   an outer fabric disposed on said outer surface of said belt body and an inner fabric disposed on said inner surface of said belt body, wherein said outer and inner fabrics each have a stretchable first material configured to be more stretchable in said longitudinal direction than said longitudinally extending tension member material of said tension member, and a second material configured to be non-stretchable, the second material extending in said width direction.

2. The flat belt according to claim 1, wherein at least one of said outer and inner fabrics comprise a yarn, said yarn being covered with a mixture including a binder and a fluoropolymer resin.

3. The flat belt according to claim 2, wherein at least one of said outer and inner fabrics is subjected to a treatment involving penetration of a solution including said mixture into said at least one of outer and inner fabrics, and dry treating so as to cover said yarn with said mixture.

4. The flat belt according to claim 2, wherein said binder comprises at least one of a urethane resin, a rubber latex, and an acrylic resin.

5. The flat belt according to claim 2, wherein said yarn is covered with a mixture including a binder and a fluoropolymer resin.

6. The flat belt according to claim 1, wherein at least one of said outer and inner fabrics comprises a first yarn disposed in said longitudinal direction, said first yarn being stretchable in said longitudinal direction.

7. The flat belt according to claim 1, wherein at least one of said outer and inner fabrics comprises a first yarn disposed in said longitudinal direction, wherein said first yarn is a multifilament yarn.

8. The flat belt according to claim 7, wherein said multifilament yarn comprises at least one of a bulky yarn, a yarn which is formed by bundling a plurality of filaments, and a covering yarn, said covering yarn comprising a core elastomeric strand and a cover strand covering over said core elastomeric strand.

9. The flat belt according to claim 1, wherein at least one of said outer and inner fabrics comprises a second yarn disposed in a width direction of said flat belt, said second yarn comprising at least one of a monofilament and a spun yarn.

10. The flat belt according to claim 1, wherein at least one of said outer and inner fabrics comprises a first yarn disposed in said longitudinal direction, said first yarn including at least one of a crimped fiber strand, a polytrimethylene terephthalate fiber strand, and an elastomeric strand.

11. The flat belt according to claim 1, wherein at least one of said outer and inner fabrics is one of a woven fabric and a knitted fabric.

12. The flat belt according to claim 1, wherein said tension member is a fabric tension member.

13. The flat belt according to claim 12, wherein the tensional stiffness of said tension member is greater than that of said first and second outer and inner fabrics in said longitudinal direction.

14. The flat belt according to claim 1, wherein the belt body includes an elastomer layer provided between at least one of said outer and inner fabrics and the tension member.

15. The flat belt according to claim 14, wherein the elastomer layer comprises a theremoplastic elastomer.

\* \* \* \* \*